United States Patent [19]

Malik

[11] Patent Number: 4,705,665
[45] Date of Patent: Nov. 10, 1987

[54] METHOD FOR INHIBITING OXIDATION OF FERROUS METALS WITH ALKYL GLYCOSIDES AND COMPOSITION FOR CLEANING FERROUS METALS

[75] Inventor: Arshad H. Malik, Decatur, Ill.

[73] Assignee: A. E. Staley Manufacturing Company, Decatur, Ill.

[21] Appl. No.: 808,585

[22] Filed: Dec. 13, 1985

Related U.S. Application Data

[63] Continuation-in-part of Ser. No. 727,647, Apr. 26, 1985.

[51] Int. Cl.$^4$ .................... C11D 7/08; C23F 11/04; C23G 1/06
[52] U.S. Cl. .......................... 422/12; 134/3; 134/41; 252/136; 252/142; 252/146; 252/174.17; 252/396; 252/407; 422/14
[58] Field of Search ............ 252/174.17, 142, 136, 252/396, 407; 134/3, 41; 422/12, 14

[56] References Cited

U.S. PATENT DOCUMENTS

| | | | |
|---|---|---|---|
| 2,977,315 | 3/1961 | Scheib et al. | 252/106 |
| 2,990,374 | 6/1961 | Schwartz | 252/136 |
| 3,219,656 | 11/1965 | Boettner | 536/18.3 |
| 3,591,510 | 7/1971 | Zenk | 252/527 |
| 3,640,998 | 2/1972 | Mansfield et al. | 536/18.3 |
| 3,653,095 | 4/1972 | Dupre et al. | 252/156 |
| 3,793,221 | 2/1974 | Otrhalek et al. | 252/136 |
| 3,839,318 | 10/1974 | Mansfield | 536/18.6 |
| 4,154,706 | 5/1979 | Kenkare et al. | 252/547 |
| 4,223,129 | 9/1980 | Roth et al. | 536/4 |
| 4,359,391 | 11/1982 | Salathiel et al. | 252/8.55 C |
| 4,404,040 | 9/1983 | Wang | 134/22.14 |
| 4,483,780 | 11/1984 | Llenado | 252/135 |
| 4,528,106 | 7/1985 | Grolitzer | 252/8.55 D |
| 4,536,318 | 8/1985 | Cook et al. | 252/174.17 |

FOREIGN PATENT DOCUMENTS 0077167 4/1983 European Pat. Off. .

OTHER PUBLICATIONS

Rohn & Haas Publications CS–400 & CS–449 dated Jan. 1978 and Nov. 1979.
"A Greasy Soiled Hard Surface Cleaning Test" by Morris A. Johnson, JAOCS, vol. 61, No. 4, pp. 810–813, (Apr. 1984).
"Formulation of Hard Surface Spray Cleaners" by Johnson et al. as reported in *Detergents and Specialties*, Jun. 1969, pp. 28–32 and 56.
Preparation of Metals for Painting by Samuel Spring at p. 40, Reinhold Publishing Corporation 1965.
Dowfax Surfactants, pp. 1–20, 1979, 80 & 82, The Dow Chemical Company.

*Primary Examiner*—Dennis L. Albrecht
*Attorney, Agent, or Firm*—Michael F. Campbell; James B. Guffey; J. Daniel Wood

[57] ABSTRACT

Glycosides and polyglycosides are described having the formula $$R(OG)_x$$

wherein

R is an aliphatic hydrocarbon radical having from 1 to 25 carbon atoms or is a radical with the formula $R_1(OR_2)_n$ which does not have more than 25 carbon atoms and wherein n=0 to 24 and $R_1$ and $R_2$ are aliphatic hydrocarbon radicals, G is selected from the group consisting of fructose, glucose, mannose, galactose, talose, gulose, allose, altrose, idose, arabinose, xylose, lyxose, ribose or mixtures thereof, and x is 1 to 30 which glycosides and polyglycosides inhibit oxidation and acid attack of ferrous metals.

17 Claims, No Drawings

METHOD FOR INHIBITING OXIDATION OF FERROUS METALS WITH ALKYL GLYCOSIDES AND COMPOSITION FOR CLEANING FERROUS METALS

This is a continuation-in-part of the application having Ser. No. 727,647 filed Apr. 26, 1985. The specification of Ser. No. 727,647 is incorporated by reference herein.

This application relates to the inhibition of oxidation of ferrous metals. More particularly, this invention relates to the use of alkyl glycosides, alkyl polyglycosides (APGs) or mixtures thereof to inhibit the oxidation of ferrous metals and acid attack of ferrous metals.

Ferrous metals when soiled frequently are the subject of cleaning with cleaning compositions. Acid cleaning compositions often are used for the removal of soil such as iron oxides in a process known as pickling. More broadly, however, acid is used for the removal of mill scale (hot-rolled scale) developed during hot forming of metal; scale developed during welding; scale developed during heat treating; superficial oxide which interferes with painting, porcelain enameling, tinning, galvanizing, or electroplating; rust and corrosion products; proteinous deposits; hard water scale; and products of reaction of hard water with soil, especially protein. Acids commonly used for cleaning ferrous metals include, but are not limited to, sulfuric acid, hydrochloric acid, phosphoric acid, nitric acid, hydrofluoric acid and organic acids such as oxalic acid, trichloracetic acid, citric acid, formic acid and acetic acid.

Acid cleaning action is enhanced by the use of surfactants especially when a soil such as an oxide is combined with another soil such as oil. Hence, surfactants form an important part of cleaning compositions for the removal of soil from ferrous metals by acid cleaners. Surfactants have the property of concentrating at the surface to be cleaned to facilitate cleaning. Further, surfactants facilitate cleaning in various other ways which include, but are not limited to, the neutralization of forces which attract soil to the surface to be cleaned and the retention of soil in suspension after its removal to prevent its redeposition on the cleaned surface.

Moreover, with acid cleaning it is often desirable to have minimal acid attack on the base metal. Excessive reaction with the metal consumes acid, creates fumes, enhances hydrogen embrittlement, produces smut, and may remove enough metal to affect tolerances.

After cleaning a moist clean ferrous metal surface, such as steel, with a mildly acidic residue rerusts very rapidly. Rerusting can be minimized by rapid dry-off and by maintaining the part submerged in cool water prior to a rapid dry-off. If the water is alkaline, oxidation may be inhibited; soda ash or lime is often used in the final rinse to prevent rusting during handling. Sodium nitrite solutions of from 0.1 to 10% concentration, depending on the time of storage, are often used as a final rinse (and can be quite effective) for those cases where the parts should not be covered with an oily rust preventive. Sodium nitrite, however, leaves a surface deposit which sometimes is considered undesirable in metal working. Moreover, because the salt tends to break up emulsions it causes problems in the formulation of metal cleaners.

As used throughout this application, oxidation means the alteration of a ferrous metal by the formation of oxides which include but are not limited to rust and mill scale. As used throughout this application, acid attack means the reaction of an acid with a ferrous metal. Ferrous metal means iron or an alloy of iron containing more iron than any other metal, the most common iron alloy being steel.

It is an object of this invention to provide a method for the inhibition of oxidation of ferrous metals.

It is another object of this invention to provide an oxidation inhibitor for ferrous metals which is stable in an acid medium.

It is still another object of this invention to provide a method for the moderation of acid attack on ferrous metals.

It is yet another object of this invention to provide a surfactant, oxidation inhibitor and additive for acid cleaning compositions for ferrous metals.

These and other objects of the invention will become more apparent with reference to the following detailed description.

According to the invention glycosides having the formula $$R(OG)_x$$

wherein

R is an aliphatic hydrocarbon radical having from 1 to 25 carbon atoms or is a radical having the formula $R_1(OR_2)_n$ which does not have more than 25 carbon atoms and wherein n=0 to 24 and $R_1$ and $R_2$ are aliphatic hydrocarbon radicals, G is selected from the group consisting of fructose, glucose, mannose, galactose, talose, gulose, allose, altrose, idose, arabinose, xylose, lyxose, ribose or mixtures thereof, and x is 1 to 30 inhibit oxidation of ferrous metals, inhibit acid attack thereon and are stable in an acid medium. Preferably the glycosides used in the invention are alkyl glucosides (G is glucose). The degree of polymerization of the polyglycosides varies and is in the range of about 1 to 30 (x=1 to 30). When the glycosides and polyglycosides are made or purchased they most often are mixtures comprising molecules of varying degrees of polymerization. Polyglycosides in these mixtures have a degree of polymerization as high as 30, most of the polyglycosides have a degree of polymerization of 10 or less and most of the latter group has a degree of polymerization of 1 to 4. Because the glycosides are often found as mixtures x may be expressed as an average degree of polymerization which includes fractional numbers. Recognizing that the glycosides used according to the invention are mixtures with varying degrees of polymerization, preferably the degree of polymerization of the polyglycosides is from about 1 to about 10 and most preferably is in the range of from about 1 to about 4. R is at the $C_1$ position of the glycoside and preferably R is an alkyl group which is straight chained or branched having 4 to 13 carbon atom and most preferably 9 to 13 carbon atoms.

The glycosides used in the invention inhibit oxidation within a pH range where oxidation occurs which includes a pH of 7 and below and up to a pH of about 9. They are stable in an acid medium and inhibit oxidation without leaving undesirable deposits which heretofore had been a problem. Moreover, the glycosides used in the invention inhibit acid attack of metallic iron and alloys thereof. According to the method of the invention, solutions having less than two percent by weight on a dry basis of inorganic salts and comprising, on a total weight basis, from about 0.1 to about 50 percent by weight of the glycosides of the invention, preferably from about 1 to about 20 percent by weight and most preferably about 1 to about 10 percent by weight are applied to the ferrous metal to inhibit oxidation and acid attack thereof. The solutions may be made with any solvent which solvates the glycosides and which are compatible with ferrous metal such solvents including, but not limited to, water, glycol ether solvents including ethylene glycol monothyl ether which is available as Cellosolve, tetrahydrofurfuryl alcohol, butyl alcohol and mixtures thereof. Application of the solution may be any way of contacting the solution with the surface of the metal including, but not limited to, immersion, spraying or dipping. Thickeners, as are known, such as xanthan gum, polyacrylics or colloidal magnesium aluminum silicates which are available as Veegum may be included in the solutions of the glycosides as required. After application, the glycoside solution is permitted to evaporate or is dried from the surface of the metal.

The method of the invention is particularly pertinent to the acid cleaning of ferrous metals with acids such as sulfuric, hydrochloric, phosphoric, nitric, hydrofluoric and organic acids such as oxalic, trichloracetic, formic, citric or acetic acid, when the latter acids are combined with aqueous solutions of the glycosides of the invention to provide ferrous metal cleaning compositions. The glycosides not only act as a surfactant to assist cleaning, but also inhibit oxidation of the cleaned surface and acid attack on the base metal. Hence the cleaning compositions which include the glycosides not only clean the surface of the metal without undesirable acid attack of the base metal, but also have the unexpected property of inhibiting oxidation on cleaned surface of the metal. The aqueous acidic cleaning compositions, on a total weight basis, have from 0.1 to about 50 percent by weight of the glycosides described herein, preferably about 1 to about 20 percent by weight and most preferably about 1 to about 10 percent by weight. The aqueous cleaning compositions should preferably have a pH in the range of about 0.1 to about 4.0 and less than about two percent by weight, on a total weight basis, on a dry basis of inorganic salts for the cleaning composition to exhibit oxidation inhibition. Other ingredients such as thickeners and organic solvents as previously described may be optionally added to the cleaning composition. The cleaning compositions of the invention may be applied to the metal surface to be cleaned by dipping, spraying or immersion with contact times being a function of the application method, temperature and pH of the composition.

The various glycoside and polyglycoside compounds and processes for making them are disclosed in U.S. Pat. Nos. 2,974,134; 3,219,656; 3,598,865; 3,640,998; 3,707,535; 3,772,269; 3,839,318; 3,974,138; and 4,223,129. All of the latter patents are incorporated by reference herein. Moreover, a mixture of alkyl glucosides and alkyl polyglycosides which may be used in the method of the invention are commercially available as Triton BG-10 from the Rohm and Haas Company.

The oxidation inhibition capabilities of the glycosides of the invention were evaluated by the following test. Water with 100 ppm hardness is prepared. The material to be tested for its rust inhibition capabilities is added. Three grams of degreased cast iron chips of 15 to 40 mesh are placed on #1 filter paper having an area of one square inch and 3 ml of the test solution are added to the metal chips which then are dried for 16 hours. After drying chips and filter paper are evaluated for rust and are rated on a scale from 1 to 10 with 10 indicating no rust. In the test results shown in Table 1, hard water with no additives and a solution of sodium nitrite were used as controls. Igepal CO630, Neodol 25-3S, Biosoft D-62 and Dowfax 2A1 are known surfactants.

TABLE I

RUST INHIBITION CAPABILITIES FOR FERROUS METALS OF AQUEOUS SOLUTIONS OF GLYCOSIDES, POLYGLYCOSIDES AND OTHER SURFACTANTS

| | % Salt on dry basis | SURFACTANT CONCENTRATION | | |
|---|---|---|---|---|
| | | 0% | 1% weight % | 5% | 20% |
| Water (Control) | — | 5.0 | | | |
| $NaNO_2$ (Control) | — | | 5.0 | 9.0 | 10.0 |
| Methyl Glucoside | <1.0 | | 5.7 | 5.5 | 5.5 |
| Ethyl Glucoside | <1.0 | | 5.7 | 5.6 | 5.2 |
| Butyl Glucoside | <1.0 | | 5.0 | 5.7 | 7.3 |
| 2-Ethyl Hexyl Glucoside | <1.0 | | 4.0 | 8.0 | 8.0 |
| APG where x averages 1.5 and is derived from glucose and R is derived from $C_9$ to $C_{11}$ alcohols sold by Shell Oil Company under the name Neodol 91. | <1.0 | | 6.3 | 8.0 | 8.5 |
| APG where x averages 1.5, G is glucose and R derived from Neodol 91. | 4.1 | | 4.8 | 4.8 | 4.8 |
| APG where G is glucose, x averages about 1.8 to 3 and R is derived from Neodol 91. | 11.9 | | 6.0 | 5.5 | 4.0 |
| APG where G is glucose, x averages about 3 and R is derived from $C_{12}$ to $C_{13}$ alcohols sold by Shell Oil Company under the name of Neodol 23. | <1.0 | | 5.6 | 5.7 | 5.7 |
| APG where G is glucose, x averages about 3 and R is derived from Neodol 23. | 9.2 | | 3.5 | 4.2 | 2.5 |
| APG where G is glucose, x averages 3 and R is derived from Neodol 23. | <1.0 | | 6.5 | 7.2 | 7.2 |
| APG where G is Glucose, x averages 3 and R is derived from Neodol 23. | 12.7 | | 3.5 | 3.5 | 3.5 |
| $C_{12}$ to $C_{15}$ ethoxylated alcohols sold by Shell Chemical Company under the name of Neodol 25 which is the reaction product of alcohol with seven moles of ethylene oxide. | | | 4.2 | 3.5 | 1.0 |
| Nonylphenol ethoxylate sold by GAF under the name of Igepal which is the reaction product of 9½ moles of ethylene oxide with phenol. | | | 3.0 | 2.5 | 1.0 |
| Alkyl either sulfate sold by Shell Chemical Company under the name of | | | 2.0 | 2.0 | 1.5 |

TABLE I-continued
RUST INHIBITION CAPABILITIES FOR FERROUS METALS OF AQUEOUS SOLUTIONS OF GLYCOSIDES, POLYGLYCOSIDES AND OTHER SURFACTANTS

| | % Salt on dry basis | SURFACTANT CONCENTRATION | | |
|---|---|---|---|---|
| | | 0% | 1% weight % | 5% | 20% |
| Neodol 25-3S. Sodium linear alkyl benzene sulfonate which is an anionic surfactant sold by Stephan Chemical Company under the name of Biosoft D-62. | | | 2.0 | 1.5 | 1.0 |
| A branched $C_{12}$ alkylated diphenyl oxide disulfonate some of which is a sodium salt and which is an anionic surfactant sold by The Dow Chemical Company under the trademark Dowfax 2A1. | | | 2.0 | 1.5 | 1.0 |

Higher Number represents better results.
10 = No Rust
1 = Very Heavy Rust

The capabilities of solutions of the glycosides of the invention to inhibit the acid attack of a ferrous metal surface were tested in various acids as indicated below. In each case the glycoside was a glucoside. The test was conducted by first recording the weight of a piece of galvanized steel ($3'' \times \frac{1}{2}'' \times \frac{1}{8}''$), then heating the steel in the acid for six hours and then measuring and recording the weight loss of the steel. The experiment then was repeated using the acid and APG combination. The weight loss with the APG acid solution divided by the weight loss with the acid alone yields the percent corrosion inhibition data illustrated in Table II.

TABLE II
APG AS A CORROSION INHIBITOR
% CORROSION INHIBITION IN ACID

| SURFACTANT 0.1% | ALKYL GROUP | AVERAGE DP | 5% HCL | 10% SULFURIC | 10% SULFAMIC | 10% PHOSPHORIC | 10% CITRIC | 10% FORMIC |
|---|---|---|---|---|---|---|---|---|
| APG, R is derived from Neodol 91 | $C_{9, 10, \& 11}$ | 1 | 19.3 | 35.8 | 54.3 | 20.9 | 8.5 | 31.5 |
| APG, R is derived from Neodol 91 | " | 3.0 | 23.8 | 41.7 | 63.3 | 27.8 | 6.1 | 22.18 |
| APG, R is derived from Neodol 23 | $C_{12, \& 13}$ | 3.0 | 16.9 | 38.6 | 51.1 | 17.7 | 13.4 | 23.9 |
| APG, R is a straight chain | $C_8$ | 3.3 | 27.5 | 66.4 | 72.5 | 57.6 | 59.8 | 39.1 |
| APG, R is a straight chain | $C_{10}$ | 3.4 | 41.8 | 45.0 | 54.0 | 34.8 | 23.2 | 43.5 |
| APG, R is a straight chain | $C_{14}$ | 5.7 | 41.7 | 62.5 | 60.5 | 44.3 | 36.6 | 25.0 |
| APG, R is a straight chain | $C_{16}$ | 4.2 | 25.5 | 53.7 | 54.6 | 24.1 | 24.1 | 28.3 |
| *Dowfax 2A1 | | | 7.1 | 39.4 | 52.7 | 20.3 | 20.3 | 13.0 |

*Trademark of The Dow Chemical Company.

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A method for inhibiting oxidation or acid attack of a ferrous metal comprising:
    contacting the surface of the ferrous metal with a solution which has less than about 2 percent by weight inorganic salts and which solution includes from about 1 to about 20 percent by weight of a glycoside having the formula $R(OG)_x$ wherein
    R is an aliphatic hydrocarbon radical having from 1 to 25 carbon atoms or is a radical with the formula $R_1(OR_2)_n$ which does not have more than 25 carbon atoms and wherein n=0 to 24 and $R_1$ and $R_2$ are aliphatic hydrocarbon radicals,
    G is selected from the group consisting of fructose, glucose, mannose, galactose, talose, gulose, allose, altrose, idose, arabinose, xylose, lyxose, ribose or mixtures thereof, and x is 1 to 30.

2. A method as recited in claim 1 wherein G is glucose, the solution is an aqueous solution and R is an aliphatic hydrocarbon radical.

3. A method as recited in claim 2 wherein the solution is aqueous and has a pH in the range of from about 0.1 to about 4.

4. A method as recited in claim 2 wherein the glycoside comprises from about 1 to about 10 percent by weight of the solution.

5. A method as recited in claim 2 wherein R is an alkyl group which is a straight chain or is a branched chain having 4 to 13 carbon atoms and x=1 to 10.

6. A method as recited in claim 3 wherein R is an alkyl group which is a straight chain or is a branched chain having 4 to 13 carbon atoms and x=1 to 10.

7. A method as recited in claim 4 wherein R is an alkyl group which is a straight chain or is a branched chain having 9 to 13 carbon atoms and x=1 to 4.

8. A method as recited in claim 3 wherein R is an alkyl group which is a straight chain or is a branched chain having 9 to 13 carbon atoms and x=1 to 4.

9. A method as recited in claim 4 wherein R is a straight chain or is a branched chain having 9 to 13 carbon atoms and x=1 to 4.

10. A method as recited in claim 1 wherein said method is for inhibiting oxidation.

11. A method as recited in claim 2 wherein said method is for inhibiting oxidation.

12. A method as recited in claim 5 wherein said method is for inhibiting oxidation.

13. A method as recited in claim 12 wherein the solution has a pH of about 7 or below.

14. A method as recited in claim 1 wherein $n=0$.

15. A method as recited in claim 2 wherein $n=0$.

16. A method as recited in claim 3 wherein $n=0$.

17. A method as recited in claim 4 wherein $n=0$.

* * * * *